(12) United States Patent
Lopez Villegas et al.

(10) Patent No.: US 6,975,165 B2
(45) Date of Patent: Dec. 13, 2005

(54) METHOD AND SYSTEM FOR THE CONVERSION OF PHASE SHIFT KEYING SIGNALS (PSK) INTO AMPLITUDE SHIFT KEYING SIGNALS (ASK)

(75) Inventors: Jose Ma. Lopez Villegas, Barcelona (ES); Josep Samitier I Marti, Barcelona (ES)

(73) Assignee: Seiko Epson Corporation, (JP)

( * ) Notice: Subject to any disclaimer, the term of this patent is extended or adjusted under 35 U.S.C. 154(b) by 37 days.

(21) Appl. No.: 10/942,109

(22) Filed: Sep. 15, 2004

(65) Prior Publication Data
US 2005/0105633 A1   May 19, 2005

Related U.S. Application Data

(63) Continuation of application No. PCT/ES02/00126, filed on Mar. 15, 2002.

(51) Int. Cl.[7] .............................. H03D 1/00; H03D 3/00
(52) U.S. Cl. ....................................... 329/304; 329/347
(58) Field of Search ................................ 329/304–310, 329/347; 331/173; 375/320, 329–333

(56) References Cited

U.S. PATENT DOCUMENTS

| | | | |
|---|---|---|---|
| 4,021,743 A | * | 5/1977 | Claxton ........................ 329/305 |
| 4,355,404 A | * | 10/1982 | Uzunoglu ..................... 375/332 |
| 4,653,071 A | | 3/1987 | Sgrignoli |
| 4,715,047 A | * | 12/1987 | Hambley ...................... 375/330 |
| 5,090,027 A | | 2/1992 | Ohsawa |
| 5,818,297 A | | 10/1998 | Levionnais |
| 2002/0167693 A1 | * | 11/2002 | Vrazel et al. ................ 359/109 |
| 2003/0002121 A1 | * | 1/2003 | Miyamoto et al. ........... 359/183 |

OTHER PUBLICATIONS

International Search Report for PCT/ES02/00126; ISA/SPTO; Mailed: May 28, 2002.

* cited by examiner

*Primary Examiner*—David Mis
(74) *Attorney, Agent, or Firm*—Harness, Dickey & Pierce, P.L.C.

(57) ABSTRACT

A system for the conversion of digital phase shift keying (PSK) signals into digital amplitude shift keying (ASK) signals.

The system consists of a power divider, PDIV, with an input, into which a PSK signal at a frequency of $2f$ is injected, where f is half the frequency of a carrier signal and with an even number M of outputs, from which corresponding signals, $i_1 \ldots i_M$, are obtained at equal frequency and phase, connected to M argument dividers with tuneable natural resonant frequency, $Div_1 \ldots Div_M$, obtaining M output signals, $O_1 \ldots O_M$, from the said dividers and M-1 power combiners, $PC_1 \ldots PC_{M-1}$, the inputs of which are connected two by two to the said M output signals, $O_1 \ldots O_M$, providing M-1 ASK signals at the outputs of the said power combiners, which correspond respectively to each of the M-1 possible changes in phase of the said input PSK signal.

12 Claims, 9 Drawing Sheets

State of the art

State of the art

State of the art

State of the art

METHOD AND SYSTEM FOR THE CONVERSION OF PHASE SHIFT KEYING SIGNALS (PSK) INTO AMPLITUDE SHIFT KEYING SIGNALS (ASK)

SCOPE OF THE INVENTION

The invention relates to a method and system for the conversion of Digital Phase Shift Keying signals (PSK) into Digital Amplitude Shift Keying signals (ASK). The basic operating principles of the invention are the locking of resonant circuits by superharmonic injection, together with the interference phenomena.

The cascade connection of the proposed system with an envelope detector allows the direct demodulation of Binary PSK signals (BPSK) without any need for a carrier recovery system, (i.e. Costas Loop). Both system and method can be extrapolated to the demodulation of Quadrature PSK signals (QPSK) or M-ary PSK signals (MPSK).

The general application fields of the invention are digital communications, particularly wireless digital communications.

BACKGROUND OF THE INVENTION

The digital phase shift keying of a sinusoidal signal (PSK) is one of the most efficient modulation techniques, both in terms of noise immunity and required bandwidth. Nevertheless, the demodulation of PSK signals requires complex demodulator systems. Therefore, other less efficient digital modulation schemes are usually preferred because of their simpler demodulation, for instance Frequency Shift Keying (FSK) or Amplitude Shift Keying (ASK).

The simplest PSK signal is the Binary PSK signal (BPSK). In this case, the carrier phase is shifted between two possible states, 0° and 180°, according to the bit stream. BPSK signals can be easily obtained by multiplying the carrier by +1 (0° phase state) or by −1 (180° phase state). From the receiver point of view, it is impossible to know if the phase of an incoming BPSK signal corresponds to 0° state or to 180° state. This is due to the fact that the actual propagation path from the emitter to the receiver is usually unknown. To avoid this indetermination, the information to be transmitted is coded as transitions between phase states, instead of being coded as fixed phase values. Therefor, when a logic "1" has to be transmitted then the phase of the carrier signal is shifted, whereas the phase is unchanged for a logic "0", or vice versa. The signal coded in this way is known as Differential BPSK (DBPSK). It should be noted that from the signal point of view there is no difference between BPSK and DBPSK. The only difference between them is the pre-processing (at the transmitter side) or post-processing (at the receiver side) of the base-band signal. FIG. 1, shows the generation of BPSK or DBPSK signal as the product of the Base-band signal (derived from the bit stream or from the processed bit stream) and the sinusoidal carrier at the desired frequency.

The usual procedure for demodulating BPSK signals is that of coherent demodulation. Basically, the demodulation process consists of multiplying the received signal by a reference signal at the same frequency as the original carrier.

Mathematically, the BPSK signal can be expressed by:

$$BPSK = \pm A\cos(wt+\phi) \qquad (1)$$

Where the +sign corresponds to the 0° phase state and the —sign to the 180° phase state. A is the amplitude of the received signal, and $\phi$ is the arbitrary phase due to signal propagation.

The reference signal, S, is given by (the amplitude is set to 1 for simplicity):

$$S = \cos(wt) \qquad (2)$$

The product, P, can be expressed as follow:

$$P = \pm A\cos(wt+\phi)\cdot\cos(wt) = \pm A/2\ \cos(\phi) \pm A/2\ \cos(2wt+\phi) \qquad (3)$$

Finally, by low pass filtering P, the following base band term is obtained:

$$P_{LPF} = \pm A/2\ \cos(\phi) \qquad (4)$$

The result is a signal, $P_{LPF}$, which reproduces the original modulation (±). From (4), if the propagation phase $\phi$ is 0° or 180°, the efficiency of the demodulation process reach its maximum (regardless of the phase indetermination). On the contrary, if $\phi = \pm 90°$, the efficiency of the demodulation process is null. This fact points out the first drawback of the coherent demodulation of PSK signals, which is the propagation phase uncertainty. The second, and most important, is the availability of a reference signal at exactly the same frequency as the original carrier.

The usual way to overcome both problems is by using a carrier recovery circuit. The most common of these circuits is the Costas Loop, the characteristics and operation of which are depicted in FIG. 2. In essence, this circuit consists of two mixers, which produce the product of the incoming signal with two reference quadrature signals (0°/90°). A third mixer, acting as phase detector, generates an error signal as the product of the low pass filtered outputs of both previous mixers. The error signal will be zero when the frequency of the reference quadrature signals is equal to the frequency of the original carrier. Moreover, the 0° labelled reference signal (in phase signal) will have either the same propagation phase of the carrier, $\phi$, or differ from it by 180°. Finally, the error signal is passed through an integrator to generate the control signal of the Voltage Controlled Oscillator (VCO) which, when combined with the 0°/90° phase shifter, generates the reference quadrature signals, and closes the loop.

In the locking state, that is to say when the error function is zero, the Costas Loop acts as a demodulator of BPSK signals. In fact, the base band modulator signal (regardless of sign uncertainty) is found at the output of the first low pass filter (LPF1 in FIG. 2). The main advantage of the coherent demodulation is the tracking of the input signal. This allows the correction of frequency deviations, for instance those due to relative movement between emitter and receiver in a mobile system. Moreover, no previous information about the modulating signal is required (i.e. the bit period).

The main drawback of the coherent demodulation procedure is the locking time of the demodulator. During this time, the demodulator system is not working properly. This fact could lead to a loss of data at the beginning of communications or malfunctioning in burst mode communications.

In the way of an example, U.S. Pat. No. 5,347,228 employs the coherent demodulation procedure, which is based on the Costas Loop (as shown in FIG. 2), and complemented by a series of additional components for detecting the demodulator tuning status (phase tuning and correct demodulation of the input signal), or the pseudo-tuning status (incorrect modulation).

U.S. Pat. No. 4,631,486 proposes an alternative procedure to achieve a phase reference which permits demodulation. In this case a certain average of the received phasors is carried out, from which a phase reference estimate is obtained. Each received phasor is compared with the reference to demodulate the signal and is then used to refine the phase reference estimate. This procedure possesses the advantage of being able to correctly demodulate signals received in a discontinuous fashion, without loss of information associated with the tuning time. Its inconvenience is the greater complexity of the demodulator system and the implicit requirement to know the modulating signal bit period in order to perform phasor averaging.

Another possible demodulation procedure for signals employing digital phase modulation is the proposal in U.S. Pat. No. 4,989,220. This method is applicable to digital phase modulated signals which only involve changes between adjacent phase states. Basically, the operating principle consists of multiplying the received with the signal received in a previous time period. The time difference is obtained through the use of a delay component and is adjusted so that it is equal to the bit time. The result of this multiplication is filtered by a lowpass filter in order to produce the dc component of the resultant signal. Only when there are phase changes in a bit period will there be a change in the value of the dc component. In this case, demodulation is carried out directly, synchronization not being required. The basic disadvantage is that the modulating signal bit period must be known beforehand.

With respect to the stated background, this invention presents the advantages of coherent demodulation (input signal tracking and demodulation process which is independent of the modulating signal bit period), but without the requirement for the explicit use of a frequency and phase locking loop (PLL or Costas loop). In essence, the proposed system is a converter of digital phase modulation (PSK) signals into digital amplitude (ASK) signals. ASK modulation is the simplest modulation scheme, both from the signal generation point of view and its demodulation, however, it is not very efficient with regards to noise immunity. The information contained in an ASK signal is transmitted by modifying the amplitude between two pre-established values. Demodulation of these signal is very simple as it only requires an envelope detector, for example, a diode and lowpass filter, followed by amplification and/or signal regeneration as necessary (FIG. 3). The simplicity of ASK signal demodulation makes it useful to have signal converters available with a more efficient modulation with respect to noise, for example, FSK or BPSK and ASK signals. While FSK to ASK converters do exist, the simplest of which is a tuned lowpass filter (FIG. 4), up to this moment in time, there have been no reports of a PSK to ASK converter.

SUMMARY OF THE INVENTION

This invention concerns a system and method for the conversion of digital phase modulated (PSK) signals into digital amplitude modulation (ASK) signals and is characterised because, in its simplest BPSK to ASK converter version, it consists of a power divider, PDIV, with an input injected with a BPSK signal at a frequency of 2f, where f is half the carrier signal frequency. The outputs of this divider are first, $i_1$, which is connected to a first argument divide by two stage having a natural tuneable resonant frequency $Div_1$, together with a second output $i_2$ of the same amplitude, frequency and phase as $i_1$, connected to a second argument divide-by-two stage having a natural tuneable resonant frequency $Div_2$, obtaining an output signal $O_1$ from the first divider $Div_1$ and an output signal $O_2$ from the second divider $Div_2$ at a frequency of f and which have a phase difference of 0° or 180°, depending on the phase changes of the input signal.

Both signals are connected to the inputs of a power combiner $PC_1$, the output of which is the sum of the two signals $O_1$ and $O_2$. When the phase difference between the two is 0°, additive interference takes place in the combiner, and when this difference is 180°, a subtractive interference occurs, so that the result is an ASK signal.

The proposed system is extrapolable to phase modulation with a greater number of symbols. Thus, it is possible to construct a OPSK to ASK converter using a power divider PDIV which provides four outputs, $i_1$, $i_2$, $i_3$ and $i_4$, all with equal amplitude, frequency and phase, which feed four argument divide-by-two stages, $Div_1$, $Div_2$, $Div_3$ and $Div_4$, with tuneable resonant frequencies. The outputs of these dividers, $O_1$, $O_2$, $O_3$ and $O_4$ are made to interfere two-by-two using power combiners to generate three ASK output lines, so that each one changes its output amplitude when input phase changes of 90°, 180° and 270° respectively are produced. A similar procedure could be employed to make an M-PSK to M-1 parallel ASK line converter which responds to each of the possible phase changes in the input signal.

Conversion Method Description

The dependency of the divider output signal phase on two arguments ($O_1$, $O_2$ etc), is the essential operational principle of the invention and is based on the fact that the argument dividers, Div1, present a locking phenomenon of both frequency and phase of its circuit when injected with a signal having a frequency close to the second harmonic of its fundamental resonant frequency. According to what has been established and verified by the inventors, this argument locking phenomenon (frequency and phase) is due to the non-linear response, which is presented to a greater or lesser extent by the components used in the argument divider circuit. The following may be pointed out as the more common sources of non-linearity:

a) the variations of capacity of the varactor diodes with the applied bias voltage in the case where these components are employed.

b) the variations in capacity in bipolar transistor base-emitter and base-collector unions in the case where these components are employed.

c) the variations in capacity in MOSFET transistor gate-source, gate-drain and gate-substrate in the case where these components are employed.

d) In MOSFET transistors, drain currents and in bipolar transistor base-collector currents depend from the polarizing voltage according a square or higher order law.

Non-linearity is responsible for harmonic mixing, which then produces new spectral components. When the argument divider is injected with a signal having a frequency 2f, which is close to $2f_r$ (where $f_r$ is the divider resonant frequency), the non-linearity (particularly those of the second order) lead to an additional contribution (of voltage and/or current) to the frequency $2f-f_r \approx f_r$. This contribution is added to that already existing at the same frequency, so that argument divider resonance characteristics are modified. It is demonstrated both analytically and experimentally, that the change in argument divider operating conditions can be expressed as a variation, $\Delta f_r$, of its resonant frequency (shown in FIG. 8), which is given by:

$$\Delta f_r = \alpha A_i f \sin(\theta) \qquad (5)$$

where α is a parameter which depends on the type of predominant non-linearity, $A_i$ is the amplitude of the input signal at a frequency of 2f and angle θ is expressed as:

$$\theta = 2\phi - \varphi + k \quad (6)$$

Where φ and φ are the input and output signal phases respectively. The value of k also depends on the non-linearity which is predominant in the circuit, for example, k=0° if the non-linearity is due to a current which is variable with the bias voltage and k=90° is the non-linearity is attributable to a variable capacity.

Additionally, the $O_i$ output from an argument divider $Div_i$, can be expressed as:

$$O_i = A_o \cos(2\pi f\, t + \varphi) \quad (7)$$

where $A_o$ is the signal amplitude and t is the time.

By taking (7) into account, the variation in the resonant frequency can be expressed by:

$$\Delta f_r = \frac{1}{2\pi} \frac{d}{dt}(2\pi f\, t + \varphi) - f_r = (f - f_r) + \frac{1}{2\pi} \frac{d\varphi}{dt} \quad (8)$$

By combining (5) and (6) with (8), the differential equation is obtained which governs the argument divider response dynamics to the injected input signal. The balanced state (lock-in state) is achieved when dφ/dt=0; or the same thing said in a different way, when the output signal frequency is exactly half the input signal frequency and therefore $\Delta f_r = f - f_r$.

By substituting this condition in (5), two possible values of balance are obtained for angle θ, which may be expressed as follows:

$$\theta_e = \arcsin\left(\frac{f_r - f}{\alpha A_i f}\right) \text{ and } \theta_m = 180^\circ - \theta_e \quad (9)$$

It has been shown that the first, $\theta_e$, corresponds to a stable balance situation, whereas the second, $\theta_m$, is a meta-stable balance situation. The stable balance angle $\theta_e$ will be small provided that the input signal has a frequency close to twice the divide-by-two argument divider's natural resonant frequency.

From (6) it can be deduced that the locking condition is not unique for output phase φ, and that there is a 180° indetermination, which is nothing more than a mathematical consequence of the argument divide-by-two. It can also be deduced that if a phase change occurs in the input signal of value $\Delta_\phi$, then in order to return to the balance conditions (locking), a phase change must be produced in the output signal, $\Delta_\varphi$, which could be:

$$\Delta\varphi = \frac{\Delta\phi}{2} \text{ or } \Delta\varphi = \frac{\Delta\phi}{2} + 180^\circ \quad (10)$$

From the analysis of the argument divider dynamic response to the input signal phase changes, it can be deduced that there is an input signal phase change critical value $\Delta\phi_c$, which is given by:

$$\Delta\phi_c = \theta_m - \theta_e = 180^\circ - 2\theta_e \quad (11)$$

where $\theta_m$ and $\theta_e$ are given by (9).

So that, if it is verified that:

$$\Delta\phi < \Delta\phi_c \text{ then } \Delta\varphi = \Delta\phi/2 + 180^\circ$$

whereas, if it is verified that:

$$\Delta\phi > \Delta\phi_c \text{ then } \Delta\varphi = \Delta\phi/2$$

Consequently, if an argument divider $Div_2$ is considered, with a resonant frequency of $f_2 > f$ from (9), $\theta_e > 0$ from (11), $\Delta\phi_c < 180^\circ$ and therefore, according to (13) an input signal phase change of 180° would cause a 90° phase change in output $O_2$. On the other hand, if an argument divider $Div_1$ is considered, with a resonant frequency of $f_1 < f$ from (9), $\theta_e < 0$ from (11), $\Delta\phi_c > 180^\circ$ and therefore, according to (12) an input signal phase change of 180° would cause a 270° (−90°) phase change in output $O_1$. In other words, if the input signal phase changes by 180°, corresponding to a BPSK signal, $O_1$ and $O_2$ would become in phase opposition, or vice versa, as shown in FIG. 11.

Finally, if both signals add, this means having minimum amplitude at the output instead of maximum, or vice versa, which constitutes am ASK signal which changes at the same rhythm as the BPSK input signal phase.

The conversion of QPSK signals to ASK can be performed by employing an extension of the proposed method. In the case of a QPSK signal, the possible phase changes are 90°, 180° and 270°. The previously described BPSK to ASK conversion method is perfectly applicable when the phase changes are 180°. In addition, the generated ASK signal does not change when the phase changes are 90° or 270°, provided that when 90°<$\Delta\phi_c$<270° for both dividers, $Div_1$ and $Div_2$. In effect, if this condition is verified and the input signal phase change is 90°, the phase changes for output signals $O_1$ and $O_2$ change in the same proportion (225° according to (12)), so that there no changes produced in the interference (phase difference between the two). A similar situation occurs when an input signal phase change of 270° occurs.

In order to detect the 90° phase changes in the input signal, it is sufficient to combine the $O_2$ output from argument divider $Div_2$ with output $O_3$ from the divider $Div_3$ fed with the same QPSK signal, and to verify that $\Delta\Phi_c < 90^\circ$ (a condition obtained by suitably adjusting the resonant frequency of the new divider $Div_3$). In such as situation, with an input phase change of 90° as has been previously seen, the $O_2$ output will change phase by 225°, whereas output $O_3$ will change (13) by 45°. Consequently, the phase difference between the two will be modified by 180°. It can easily be demonstrated that phase changes of 180° or 270° in the input signal do not change the phase difference in the $O_2$ and $O_3$ outputs. Therefore, if both signals $O_2$ and $O_3$ are summed, the result will be an ASK signal which will undergo amplitude modification whenever there is an input signal phase change of 90° and no other.

In a similar fashion, in order to detect the input signal phase changes of 270°, it is only required to combine output O1 from argument divider Div1 with the O4 output from another argument divider Div4, which verifies that $\Delta\phi^c > 270^\circ$.

In this way, the input signal with QPSK modulation is converted into three parallel ASK signals, each of which is associated with one of the possible phase changes in the QPSK signal.

From this description, the generalisation of the method for M-PSK to M-1 parallel ASK signal conversion, which corresponds to each of the possible M-1 phase changes in the input signal is immediate, employing a suitable number of $Div_1$ dividers and correctly adjusting their resonant frequencies.

SHORT DESCRIPTION OF THE DRAWINGS

DETAILED DESCRIPTION OF THE DRAWINGS

FIGS. 1 to 4 deal with the state of the technique and have already been described in the background.

Figure 1:
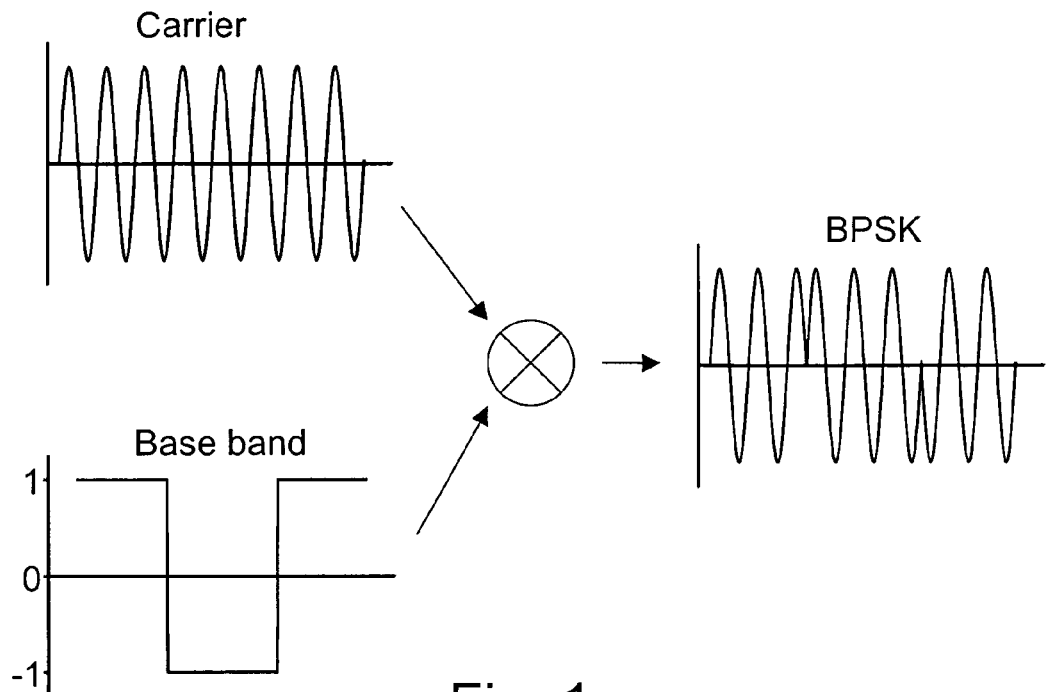
FIG. 1 is a diagrammatic representation of the generation of a BPSK signal.
Figure 2:
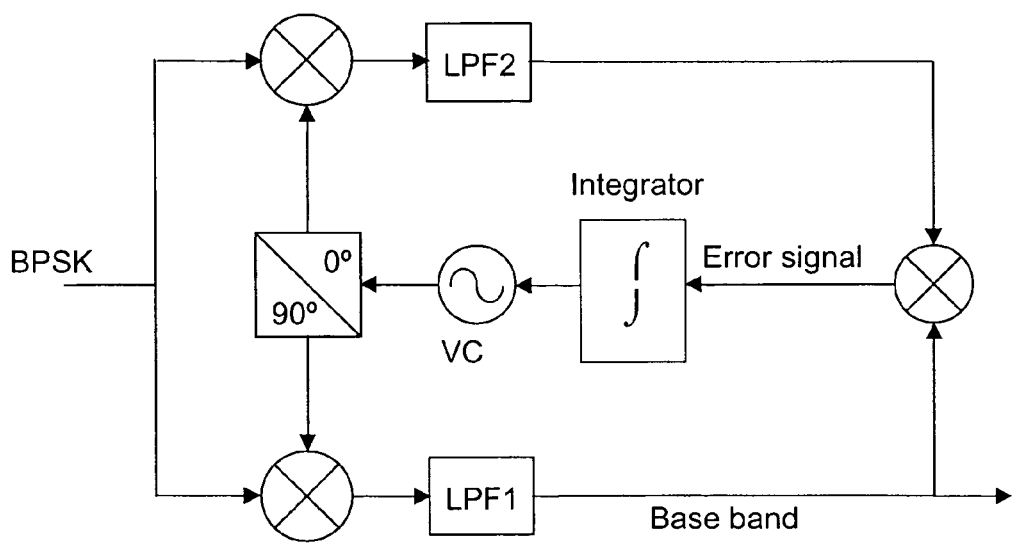
FIG. 2 shows a diagram of a Costas Loop.
Figure 3:
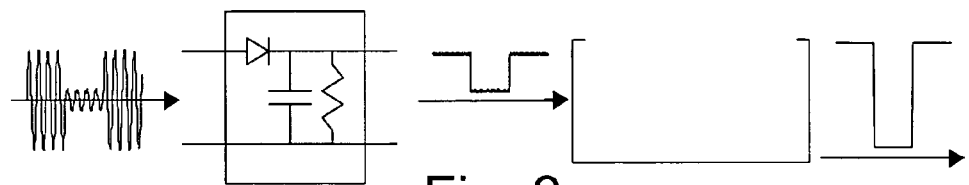
FIG. 3 shows an embodiment to demodulate an ASK signal.
Figure 4:
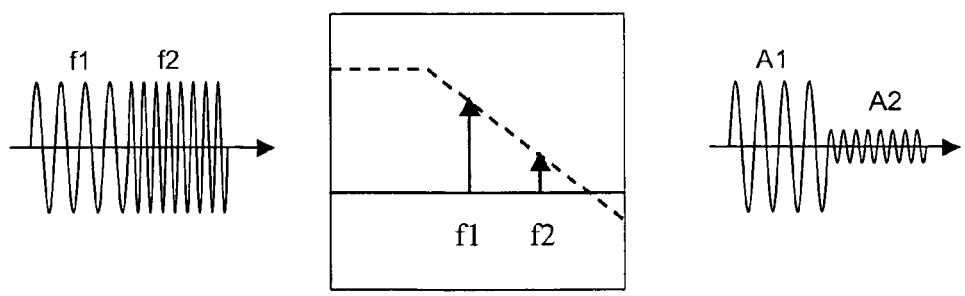
FIG. 4 shows a converter FSK to ASK.
Figure 5:
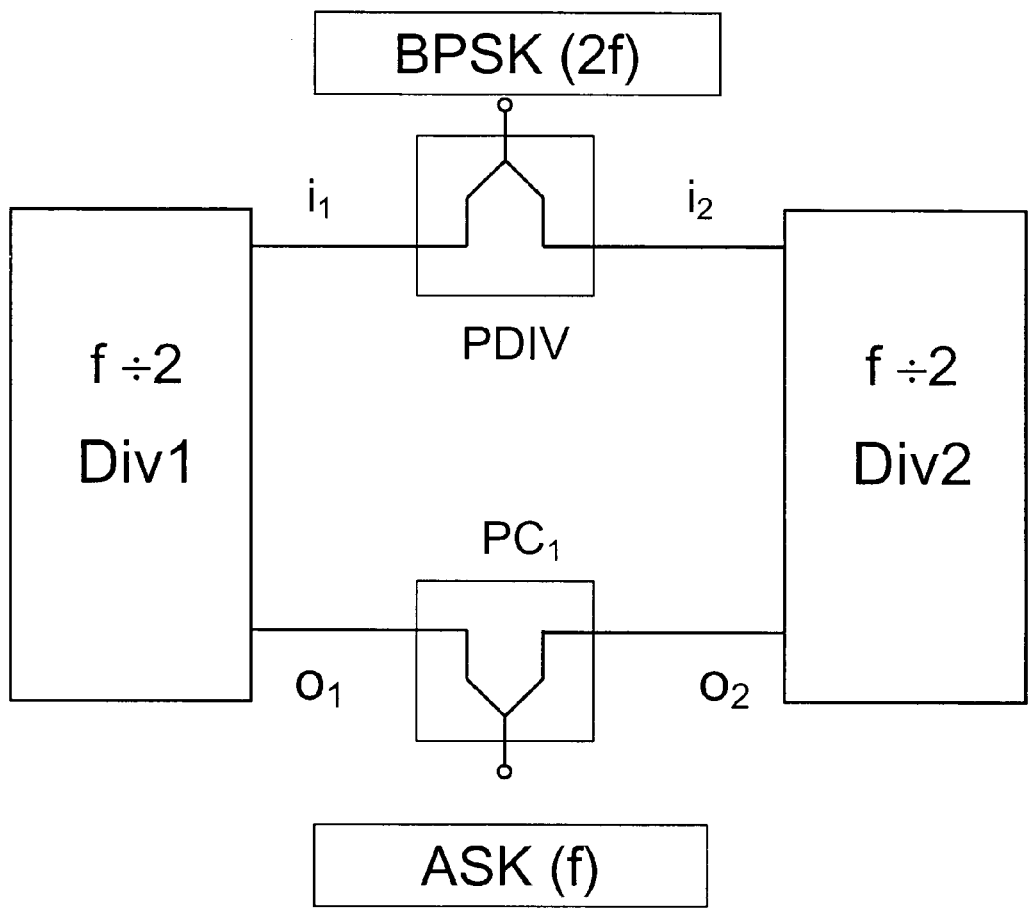
FIG. 5 shows a diagram of the preferred converter BPSK to ASK according to the present invention.

This invention provides a system and method for the conversion of Digital Phase Shift Keying signals (PSK) into Digital Amplitude Shift Keying signals (ASK). FIG. 5 shows one possible version of the useful system for the conversion of BPSK signals to a single ASK modulation output signal. The diagram in the figure can be divided into the following sections:

(a) A power divider PDIV, the input to which is the BPSK phase modulation signal at a frequency of 2f. This divider provides signals $i_1$ and $i_2$ with identical amplitude and frequency as the input signal. In addition, the two signals, $i_1$ and $i_2$ are in the same phase state, which may be the same as the input signal or with a certain phase imbalance or delay that is the same for both. This power divider may be either passive or active. In all cases, it must provide sufficient isolation between the two outputs $i_1$ and $i_2$.

(b) Two analogue argument dividers, $Div_1$ and $Div_2$, injected with signals $i_1$ and $i_2$. These dividers provide the two signals, $O_1$ and $O_2$ at a frequency (f) which is half the injected signal frequency (2f). In addition to the frequency, the phase of signals $O_1$ and $O_2$ is also fixed by signals $i_1$ and $i_2$, so that it can only take on one of two possible values having a difference of 180°. As a result, and taking into account that the injected signals, $i_1$ and $i_2$ are identical, the output signals $O_1$ and $O_2$, will be either identical (in phase) or one will be an inverted copy of the other (180° out of phase), with both situations being equally probable.

(c) A power combiner, PC, the output of which is also that of the ASK converter system. This output is formed as a linear combination (ideally the sum) of the output signals $O_1$ and $O_2$ from the described analogue argument dividers. Eventually, the output signal could be affected by delays or phase differences depending on the physical implementation finally selected for the power combiner. This physical implementation may be either passive or active and must also guarantee sufficient isolation between the two outputs, $O_1$ and $O_2$ from the described analogue argument dividers. If the $O_1$ and $O_2$ signals are identical (in phase), they will combine additively in the power combiner producing an ASK output signal having maximum amplitude. Otherwise, if these same two signals are 180° out of phase with each other, they subtractively combine in the power combiner to produce an ASK signal of minimum amplitude.

The analogue argument dividers of FIG. 5, $Div_1$ and $Div_2$, can be implemented in several ways. Passive analogue argument dividers may be employed, such as those using varactor diodes as used in patent application PCT/ES 01/00497 for the analogue quadrature signal generator; or argument dividers based on active circuits, for example, injected oscillators.

Figures 6A, 6B:
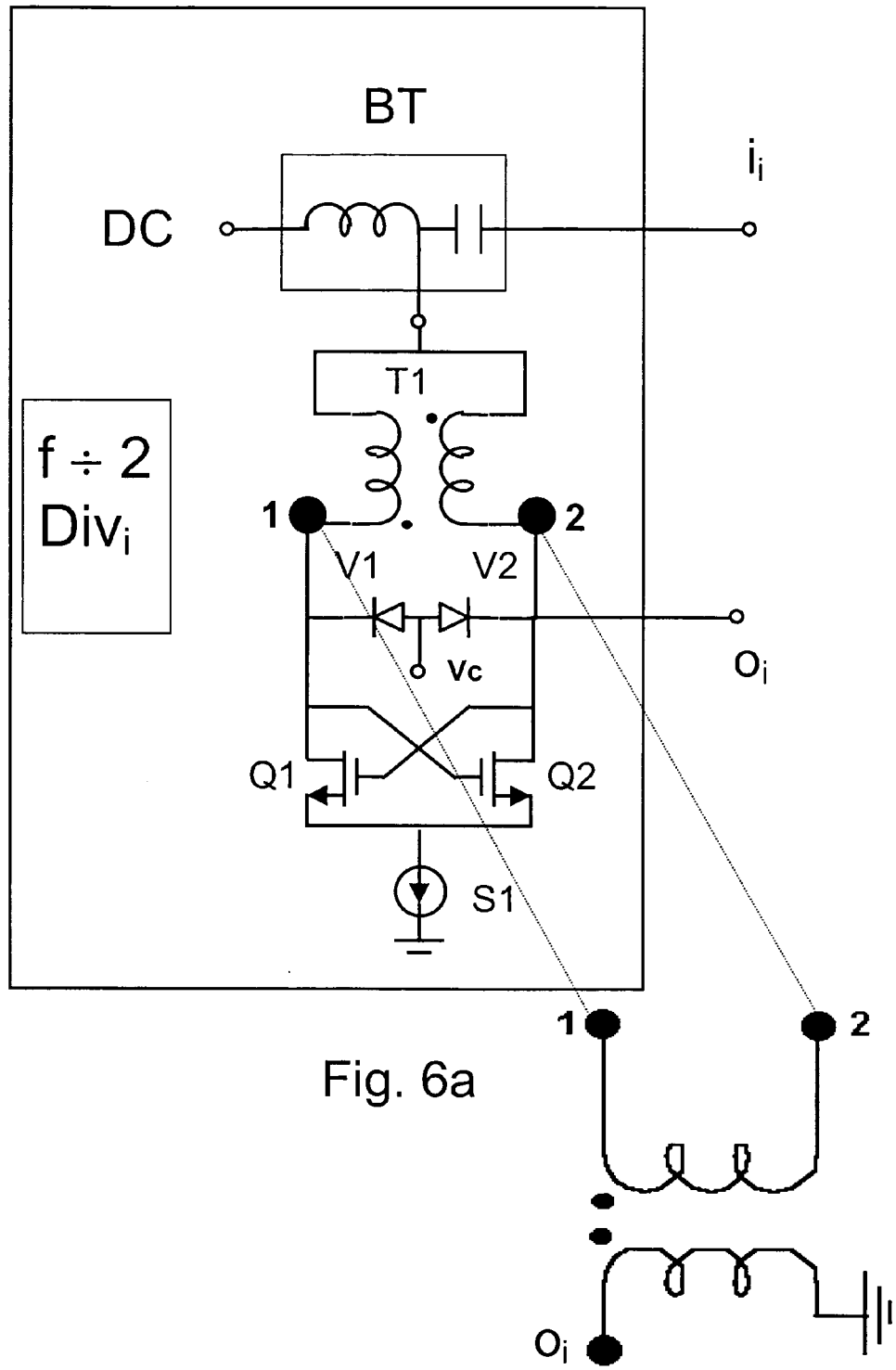
FIG. 6a shows a preferential implementation of the analogue argument dividers, $Div_1$ and $Div_2$ wherein a gain step is used.
FIG. 6b shows an implementation of the analogue argument dividers, $Div_1$ and $Div_2$ wherein a transformer has substituted the gain step.

FIG. 6a contains a preferential, but not exclusive, implementation of the analogue argument dividers, $Div_1$ and $Div_2$. The principle on which the frequency division process is based, as has already been stated, is the frequency and phase locking phenomenon of a resonant circuit when it is injected with a signal having a frequency close to the second harmonic of its fundamental frequency. The diagram consists of the following sections:

(a) T-polarisation circuit, BT, the purpose of which is to combine the injected signal at a frequency of 2f ($i_1$) with the continuous dc bias required for resonant circuit operation.

(b) An inverter transformer, T1, with primary and secondary windings connected at one end to the bias network output and the other to the varactor diodes, V1 and V2.

(c) The described varactor diodes, the anodes of which are connected to a control voltage Vc.

(d) Two cross-coupled transistors Q1 and Q2.

(e) A current source to guarantee correct transistor polarisation.

It is important to note that the frequency and phase locking time which is a characteristic of this type of divider circuit is much faster than that associated with the Costas Loop, because it is intrinsic to the actual components and not to the locking circuit as a whole as in the Costas Loop.

The transformer and the two varactor diodes form a resonant tank circuit, the resonant frequency of which is fixed by the value of control voltage Vc. These varactor diodes may be replaced by fixed value capacitors, in which case the possibility to control the resonant frequency is lost. The purpose of the cross coupled transistor pair (these are MOSFET in FIG. 6a, but they could quite easily be bipolar) is to provide sufficient gain in order to compensate the resonant tank circuit losses and to generate a constant amplitude oscillation at the resonant frequency. When the injected signal has sufficient power (see FIG. 14), the tank's resonant characteristics change. This is due to the non-linear behaviour in the varactor diode response and/or the amplifier stage transistors. The new resonant frequency is tuned to half that of the injected signal and the phase is adjusted to either of the two possible values, with a 180° difference.

Figure 7:
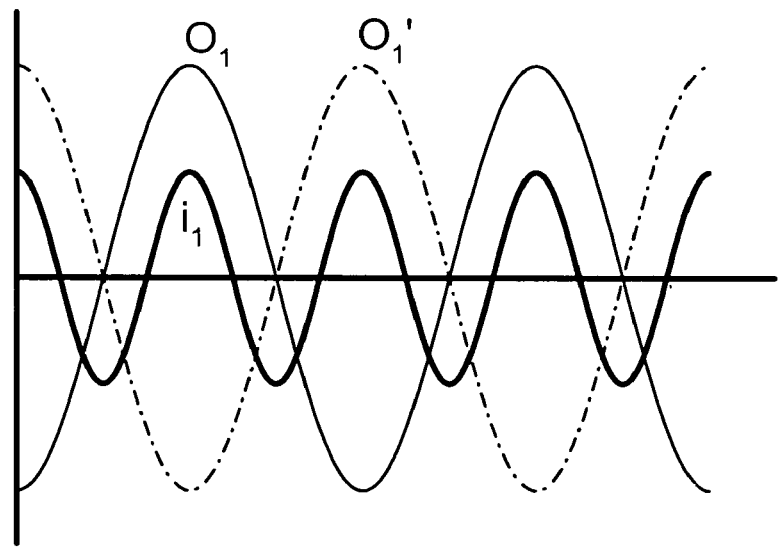
FIG. 7 is a diagrammatic representation of the timing for the injected signal, $i_1$, and the output signal, the latter in its two possible states, $O_1$ and $O_1'$.

FIG. 7 is a diagrammatic representation of the timing for the injected signal, $i_1$, and the output signal, the latter in its two possible states, $O_1$ and $O_1'$.

In order to understand the conversion method, the converter system in FIG. 5 is taken as the starting point. Before injecting the BPSK input signal at a frequency of 2f, the argument dividers, $Div_1$ and $Div_2$, as shown in the preferential implementation of FIG. 6a, are tuned to resonant frequencies $f_1$ and $f_2$, respectively, which are slightly different, and it is then verified that $f_1 < f < f_2$, where f is half the injected signal frequency. This is achieved using control voltages Vc, which permit the varactor diode bias to be modified and in consequence, change their capacity. Once the BPSK input signal has been injected, and if this has sufficient power, the resonant circuits will be tuned to frequency f, and its output phase is adjusted to one of the two possible values previously shown in FIG. 7.

Figure 8:
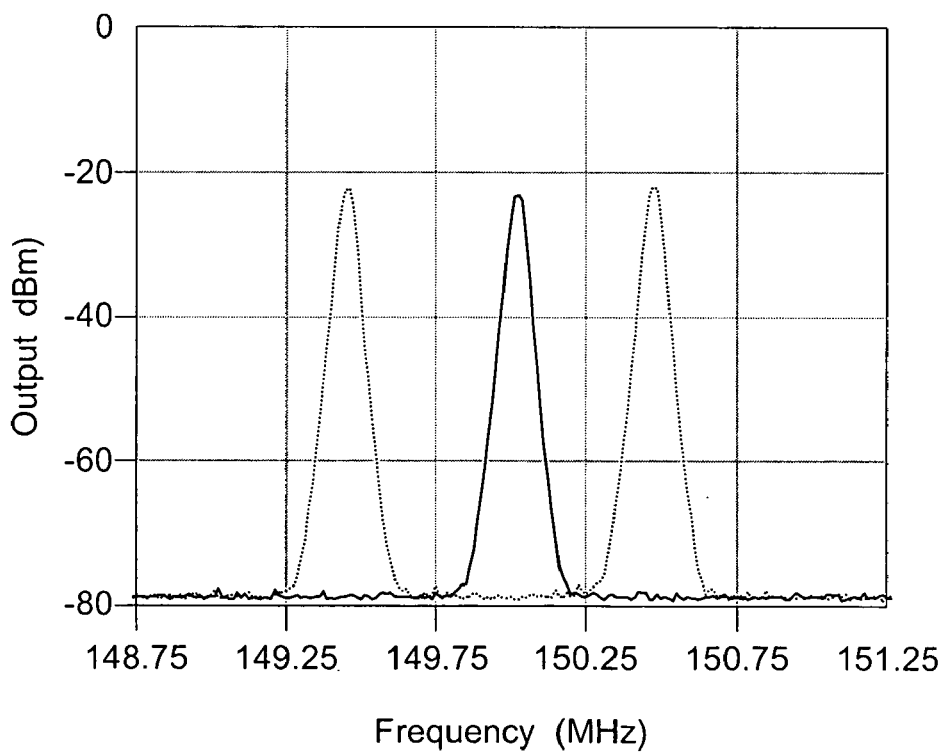
FIG. 8 shows the spectra for the output signal from the BPSK to ASK converter, before (. . . ) and after (-) injection of the input signal at 2f.

FIG. 8 shows a real measurement of the output spectra for the ASK converter system both before (broken line) and after (solid line) injection of a signal at a frequency of 2f.

Figure 9:
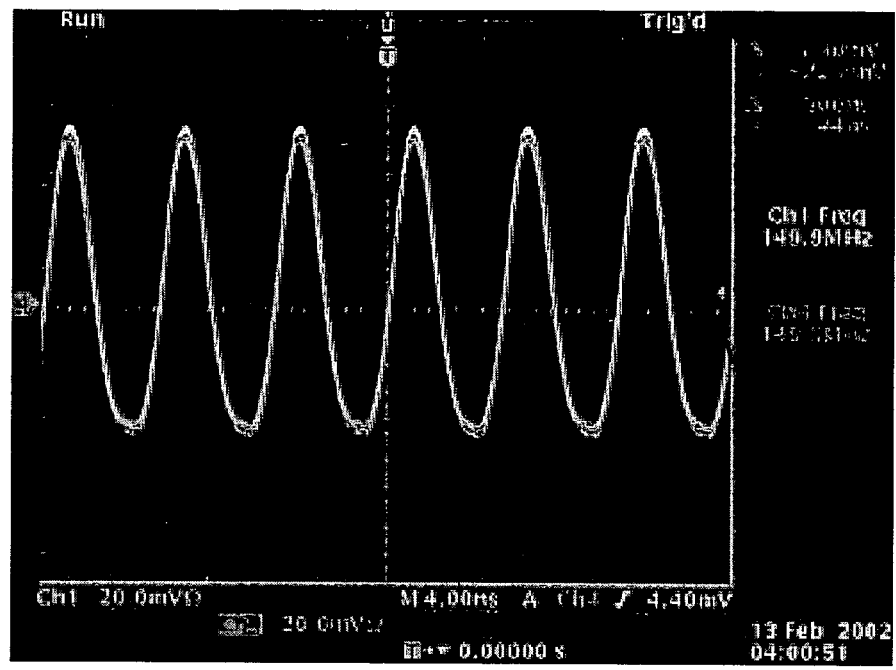
FIG. 9 shows the waveforms for the outputs $O_1$ and $O_2$ from the argument dividers $Div_1$ and $Div_2$ during the in-phase state.
Figure 10:
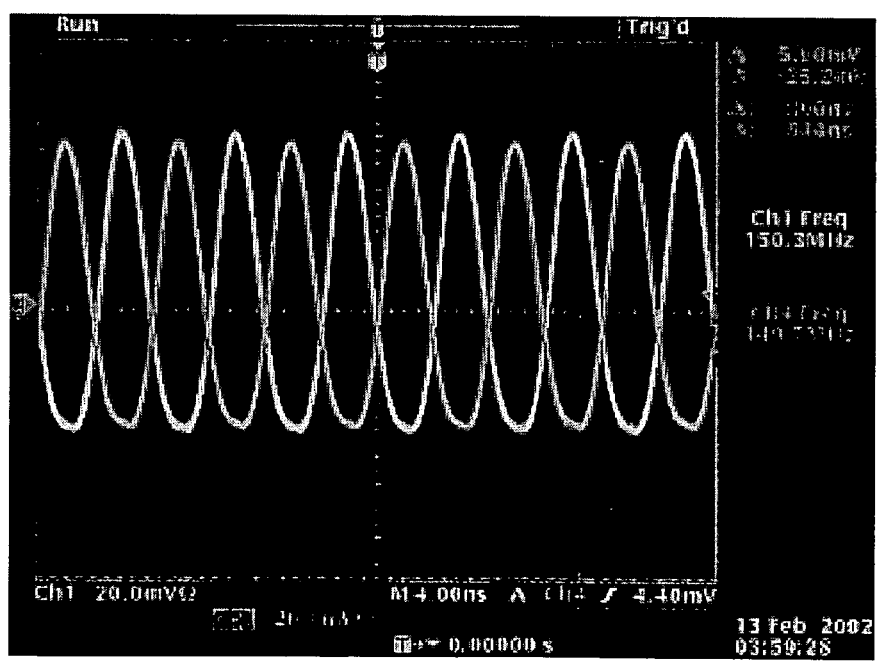
FIG. 10 shows the waveforms for the outputs $O^1$ and $O^2$ from the argument dividers $Div_1$ and $Div_2$ during the 180° out-of-phase state.

FIGS. 9 and 10 are taken from an oscilloscope screen and show the waveforms for outputs $O_1$ and $O_2$ from the argument dividers $Div_1$ and $Div_2$, after injecting the input signal at a frequency of 2f. FIG. 9 shows the phase status ($O_1$ and $O_2$ identical) whereas FIG. 10 shows the anti-phase status ($O_1$ and $O_2$ at 180° degrees phase opposition).

Figure 11:
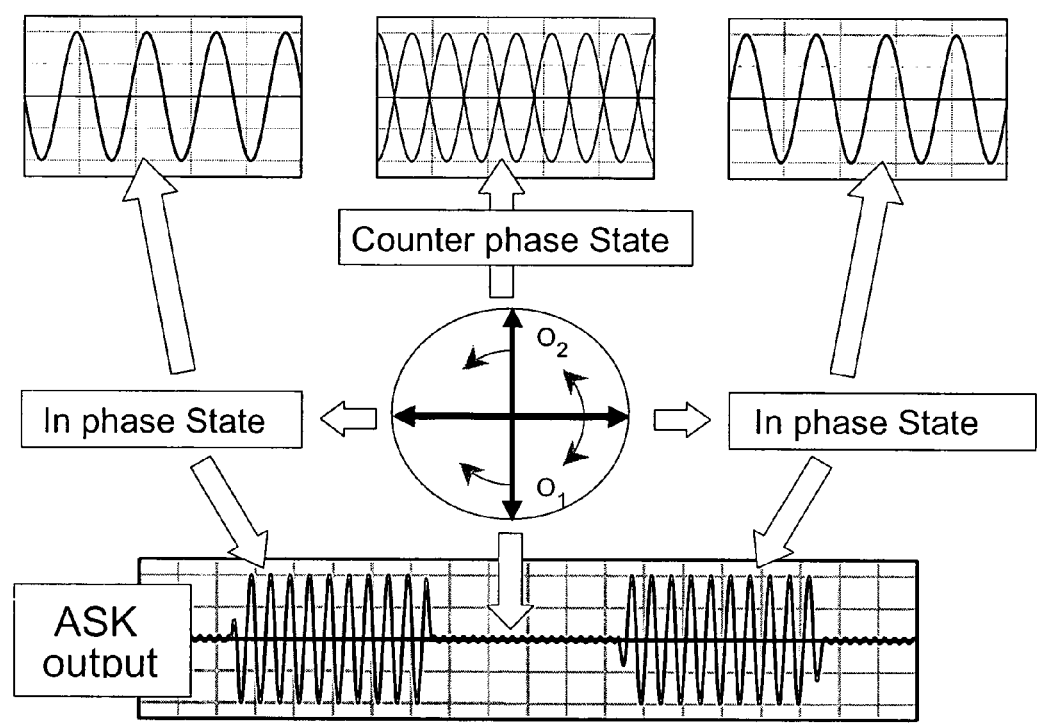
FIG. 11 is a transition diagram between in the in-phase and 180° out-of-phase states during BPSK to ASK conversion.

As has already been examined, the status of the ASK system output, either in phase or 180° phase opposition (maximum or minimum amplitude, additive or subtractive interference, respectively) is a consequence of the phase change in the BPSK input signal. This transition process is illustrated in diagrammatic form in FIG. 11.

Figure 12:
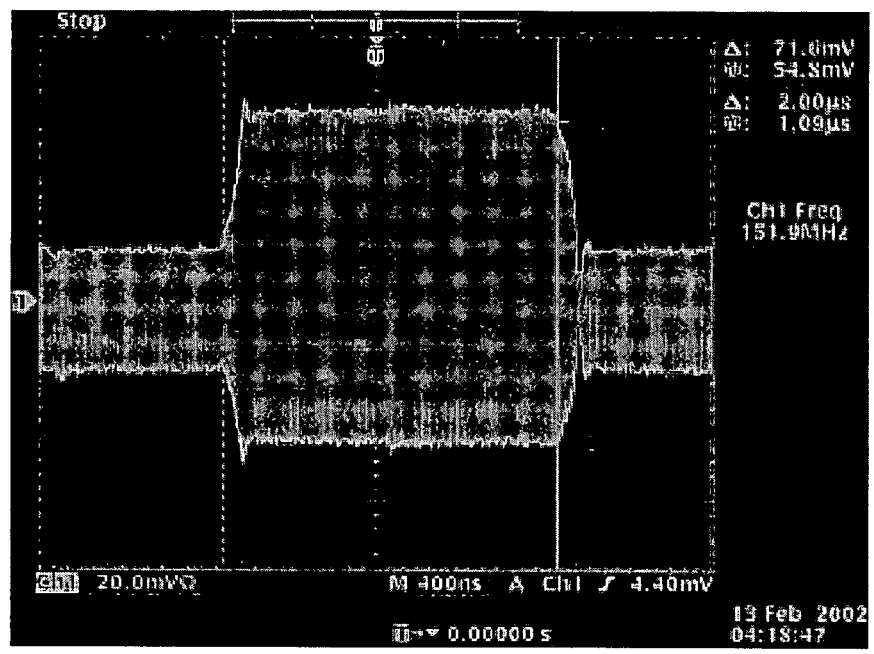
FIG. 12 shows the waveform for the converter ASK output in response to two successive 180° phase changes of the BPSK input signal.
Figure 13:
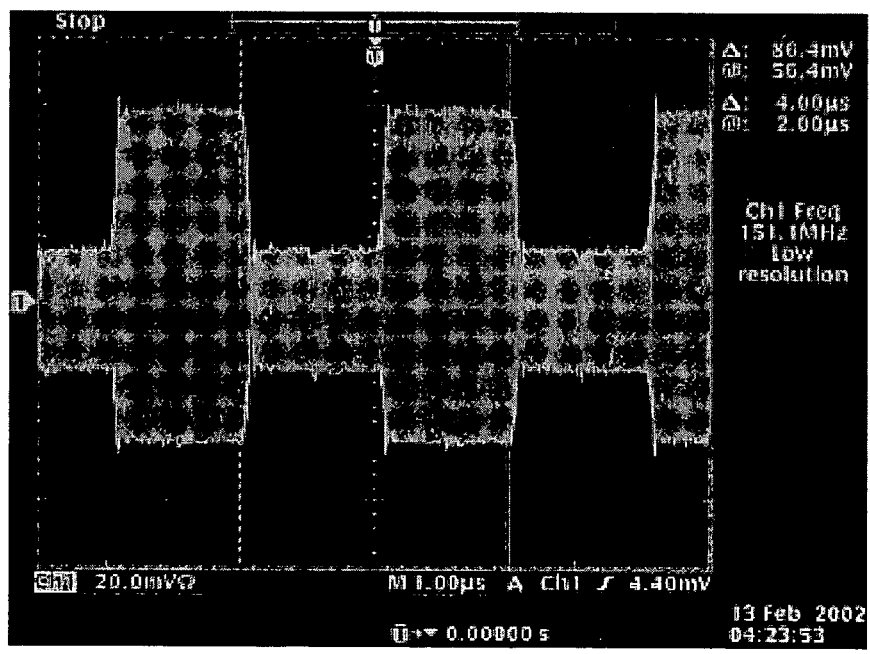
FIG. 13 shows the waveform for the converter ASK output in response to five successive 180° phase changes of the BPSK input signal.

FIGS. 12 and 13 show measurements on an oscilloscope screen of the ASK output signals where real-time conversion of a BPSK modulated signal into an amplitude modulated signal can be seen.

Figure 14:
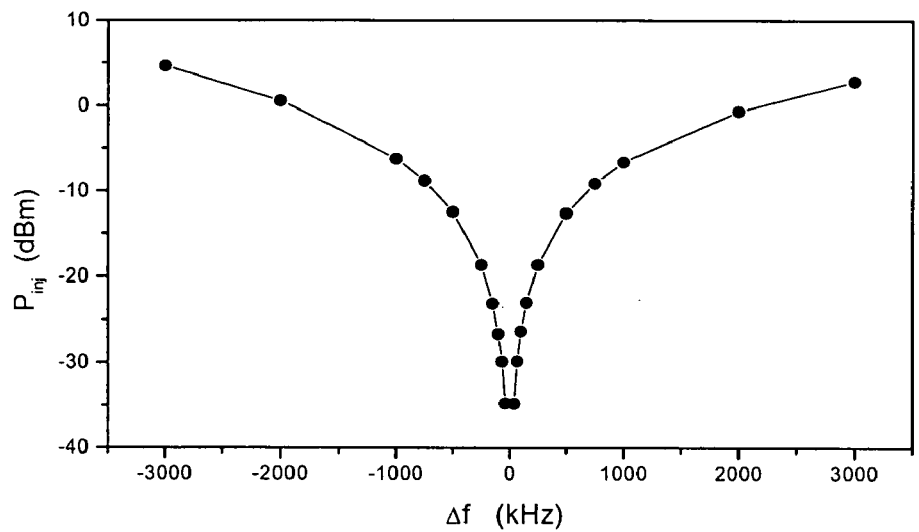
FIG. 14 shows a tuning sensitivity curve for the tuneable resonant circuit in either of the dividers, $Div_1$ ó $Div_2$.

FIG. 14 shows a characteristic tuning sensitivity curve for the tuneable resonant circuit of either of the two dividers, $Div_1$ or $Div_2$. Here, it can be seen what is the minimum divider input signal power required to enable the resonant circuit tune to it, where $\Delta f$ is the frequency deviation with respect to the circuit's natural resonant frequency (in the figure fo is 171 MHz) and where $P_{inj}$ is the minimum power necessary in order to tune this circuit to a frequency of $2(fo+\Delta f)$, which is required to achieve locking.

Figure 15:
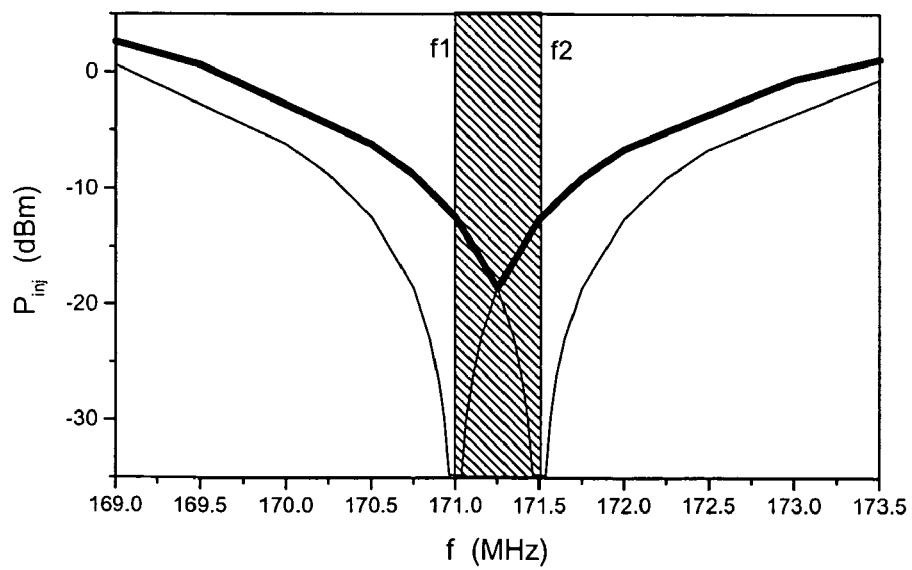
FIG. 15 shows the total tuning sensitivity curve for the converter which defines the conversion margin or effective frequential channel.

FIG. 15 shows the total sensitivity curve, which is established by taking into consideration that if the converter system has two dividers which are to lock to the frequency of the signal to be converted, one below and the other above, the total converter tuning sensitivity is found by taking the tuning sensitivity curves into account simultaneously, defining the bold black line in the figure. FIG. 15 also uses a grey line to show the converter bandwidth, which is better described as the frequential margin or channel in which efficient conversion is actually obtained. It can be seen that this channel is defined between the two natural resonant frequencies which were initially established for the two dividers, $Div_1$ and $Div_2$ and is where a reduced input signal power is required for efficient conversion.

What is claimed is:

1. A system for phase shift keying (PSK) signal conversion employing digital amplitude shift keying (ASK), characterised because it consists of a power divider, PDIV, with an entrance which is injected with a PSK signal at a frequency of 2f, where f is half the frequency of a carrier signal and with an even number, M, of outputs, from which the corresponding signals $i_1 \ldots i_M$ are obtained at equal frequency and phase, respectively connected to M dividers with natural tuneable resonant frequency of $Div_1 \ldots Div_M$, obtaining M output signals $O_1 \ldots O_M$ from these same dividers and M-1 power combiners $PC_1 \ldots PC_{M-1}$, the inputs of which are connected two by two to the said M output signals, providing at the output of these power combiners, M-1 signals with ASK modulation, which respectively correspond to each of the possible M-1 phase changes of this PSK input signal.

2. A system in accordance with claim 1, which is characterised because the number of outputs, M, from this power divider, PDIV, is equal to two so that the system performs a conversion of a signal with binary phase shift keying (BPSK) modulation into a digital signal with amplitude shift keying (ASK) modulation, which responds to phase changes of 180° in the said PSK input signal.

3. A system in accordance with claim 1, which is characterised because the number of outputs M from this power divider PDIV is equal to four so that the system performs a conversion of a signal with quadrature phase shift keying (QPSK) modulation into three signals with digital amplitude shift keying (ASK) modulation, which respectively responds to phase changes of 90°,-90° and 180° in the said PSK input signal.

4. A system in accordance with claim 1, which is characterised because each of the said argument dividers, $Div_i$, with natural tuneable resonant frequency, is analogue and consists of a T-polarisation circuit, BT, with a first input to which is applied a constant dc voltage, a second input to which the said signal $i_i$ is applied and a tuneable resonance circuit connected to the output.

5. A system in accordance with claim 4, which is characterised because this same tuneable resonance circuit consists of an inverter transformer T1, two varactor (variable capacitance) diodes, V1 and V2, connected to the ends of each winding of the said inverter transformer, arranged in-line, connected in opposition, enabling a mid point for controlling the capacitance by means of a voltage Vc which is used to dynamically tune the natural resonant frequency, together with a power stage consisting of a circuit with a global response which provides a negative differential impedance, so that this power stage compensates the losses and increases the argument divider sensitivity, taking the output signal from the said varactor diode terminals.

6. A system in accordance with claim 4, which is characterised because this same tuneable resonance circuit consists of an inverter transformer, two varactor (variable capacitance) diodes connected to the ends of each winding of the said inverter transformer, arranged in-line, connected in opposition, enabling a mid point for controlling the capacitance by means of a voltage Vc which is used to dynamically tune the natural resonant frequency and a transformer which produces the output signal.

7. A system in accordance with claim 4, which is characterised because each of the said dividers, $Div_i$, has a tuneable natural resonant frequency that is fixed during manufacture by the specifications of its components.

8. A system in accordance with claim 5, which is characterised because the said global response circuit which provides a negative differential impedance consists of a current source S1 and cross-coupled transistors Q1 and Q2.

9. A system in accordance with claim 8, which is characterised because the said transistors are MOSFET type, and this cross-coupling is achieved by connecting Q1 drain to Q2 gate and vice-versa and the sources of the transistors are connected to current source S1.

10. A system in accordance with claim 8, which is characterised because the said transistors are BIPOLAR type, and this cross-coupling is achieved by connecting Q1 collector to Q2 base and vice-versa and the emitters of the transistors are connected to current source S1.

11. A system in accordance with claim 4, which is characterised because said argument dividers, $Div_1 \ldots Div_M$, are identical, producing architectural symmetry and determining that the output signals, $O_1 \ldots O_M$, are equal in both power and frequency.

12. A method for converting digital PSK signals into digital ASK signals for a system consisting of power divider PDIV with an even number of outputs M, M argument dividers with tuneable natural resonance frequency, $Div_1 \ldots Div_M$, and M-1 power combiners, $PC_1 \ldots PC_{M-1}$, which provide outputs of M-1 ASK signals, characterised because it consists of the following steps:

(a) Tuning by means of voltage Vc with each divider $Div_1 \ldots Div_M$ corresponding to a respective resonant frequency value $f_1 \ldots f_M$ from among an increasing set of M values, so that the first half of these frequencies is less than f and a second half of the same frequencies is greater than f;

(b) Injecting a PSK input signal at a frequency of 2f into the said power divider PDIV;

(c) Obtaining identical $i_1 \ldots i_M$ signals at the M outputs from the said power divider PDIV;

(d) Injecting the said signals $i_1 \ldots i_M$ into the respective inputs of dividers, $Div_1 \ldots Div$, and obtaining corresponding output signals, $O_1 \ldots O_M$, after a process of phase and frequency locking of the natural resonant frequency of each one of its initial value $f_i$ to value f, together with phase locking at an equilibrium value between the two possible values;

(e) injecting the said output signals, $O_1 \ldots O_M$, taken two by two, at each of the respective M-1 power combiners, $PC_1 \ldots PC_{M-1}$, where they mix either additively or subtractively so that M-1 ASK modulation signals are produced, which respectively respond to each of the possible M-1 changes in phase of the said PSK input signal.

* * * * *

UNITED STATES PATENT AND TRADEMARK OFFICE
CERTIFICATE OF CORRECTION

PATENT NO. : 6,975,165 B2
APPLICATION NO. : 10/942109
DATED : December 13, 2005
INVENTOR(S) : Jose Ma. Lopez Villegas and Josep Samitier I Marti It is certified that error appears in the above-identified patent and that said Letters Patent is hereby corrected as shown below:

Column 1, Line 45: "Therefor" should be -- Therefore --

Column 2, Line 5: "follow" should be -- follows --

Column 2, Line 15: "reach" should be -- reaches --

Column 4, Lilne 10: "OPSK" should be -- QPSK --

Column 4, Line 30: "Div1" should be -- $Div_1$ --

Column 5, Line 15: "Φ" should be -- φ --

Column 5, Line 28: "Φ" should be -- φ --

Column 5, Line 48: "Φ" should be -- φ --

Column 5, Line 54: "$\Delta_\Phi$" should be -- $\Delta_\varphi$ --

Column 6, Line 2: "$\Delta_\Phi$" should be -- $\Delta_\varphi$ --

Column 6, line 6: "$\Delta_\Phi$" should be -- $\Delta_\varphi$ --

Column 6. line 22: "am" should be -- an --

Column 6, line 43: "$\Delta\Phi_c$" should be -- $\Delta\emptyset_c$ --

Column 6, line 44: "as" should be -- a --

Column 6, line 58: "O1" should be -- $O_1$ --

Column 6, line 58: "Div1" should be -- $Div_1$ --

Column 6, line 58: "O4" should be -- $O_4$ --

Column 6, Line 59: "Div1" should be -- $Div_1$ --

Column 66, Line 60: "$\Delta\Phi^c$" should be -- $\Delta\Phi_c$ --

UNITED STATES PATENT AND TRADEMARK OFFICE
CERTIFICATE OF CORRECTION

PATENT NO. : 6,975,165 B2
APPLICATION NO. : 10/942109
DATED : December 13, 2005
INVENTOR(S) : Jose Ma. Lopez Villegas and Josep Samitier I Marti It is certified that error appears in the above-identified patent and that said Letters Patent is hereby corrected as shown below:

Column 7, Line 31: "$O^1$ and $O^2$" should be -- $O_1$ and $O_2$ --

Column 7, line 45: "ó" should be -- and --

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 6,975,165 B2
APPLICATION NO. : 10/942109
DATED : December 13, 2005
INVENTOR(S) : Jose Ma. Lopez Villegas and Josep Samitier I Marti It is certified that error appears in the above-identified patent and that said Letters Patent is hereby corrected as shown below:

Column 1, Line 45: "Therefor" should be -- Therefore --

Column 2, Line 5: "follow" should be -- follows --

Column 2, Line 15: "reach" should be -- reaches --

Column 4, Lilne 10: "OPSK" should be -- QPSK --

Column 4, Line 30: "Div1" should be -- $Div_1$ --

Column 5, Line 15: "Φ" should be -- φ --

Column 5, Line 28: "Φ" should be -- φ --

Column 5, Line 48: "Φ" should be -- φ --

Column 5, Line 54: "$\Delta_\Phi$" should be -- $\Delta_\varphi$ --

Column 6, Line 2: "$\Delta_\Phi$" should be -- $\Delta_\varphi$ --

Column 6, line 6: "$\Delta_\Phi$" should be -- $\Delta_\varphi$ --

Column 6. line 22: "am" should be -- an --

Column 6, line 43: "$\Delta\Phi_c$" should be -- $\Delta\emptyset_c$ --

Column 6, line 44: "as" should be -- a --

Column 6, line 58: "O1" should be -- $O_1$ --

Column 6, line 58: "Div1" should be -- $Div_1$ --

Column 6, line 58: "O4" should be -- $O_4$ --

Column 6, Line 59: "Div4" should be -- $Div_4$ --

Column 66, Line 60: "$\Delta\Phi^c$" should be -- $\Delta\Phi_c$ --

UNITED STATES PATENT AND TRADEMARK OFFICE
CERTIFICATE OF CORRECTION

PATENT NO. : 6,975,165 B2
APPLICATION NO. : 10/942109
DATED : December 13, 2005
INVENTOR(S) : Jose Ma. Lopez Villegas and Josep Samitier I Marti It is certified that error appears in the above-identified patent and that said Letters Patent is hereby corrected as shown below:

Column 7, Line 31: "$O^1$ and $O^2$" should be -- $O_1$ and $O_2$ --

Column 7, line 45: "ó" should be -- and --

This certificate supersedes Certificate of Correction issued November 21, 2006.

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 6,975,165 B2
APPLICATION NO. : 10/942109
DATED : December 13, 2005
INVENTOR(S) : Jose Ma. Lopez Villegas and Josep Samitier I Marti It is certified that error appears in the above-identified patent and that said Letters Patent is hereby corrected as shown below:

Column 1, Line 45:   "Therefor" should be -- Therefore --

Column 2, Line 5:    "follow" should be -- follows --

Column 2, Line 15:   "reach" should be -- reaches --

Column 4, Lilne 10:  "OPSK" should be -- QPSK --

Column 4, Line 30:   "Div1" should be -- $Div_1$ --

Column 5, Line 15:   "$\Phi$" should be -- $\varphi$ --

Column 5, Line 28:   "$\Phi$" should be -- $\varphi$ --

Column 5, Line 48:   "$\Phi$" should be -- $\varphi$ --

Column 5, Line 54:   "$\Delta\Phi$" should be -- $\Delta\varphi$ --

Column 6, Line 2:    "$\Delta\Phi$" should be -- $\Delta\varphi$ --

Column 6, line 6:    "$\Delta\Phi$" should be -- $\Delta\varphi$ --

Column 6. line 22:   "am" should be -- an --

Column 6, line 43:   "$\Delta\Phi_c$" should be -- $\Delta\emptyset_c$ --

Column 6, line 44:   "as" should be -- a --

Column 6, line 58:   "O1" should be -- $O_1$ --

Column 6, line 58:   "Div1" should be -- $Div_1$ --

Column 6, line 58:   "O4" should be -- $O_4$ --

Column 6, Line 59:   "Div4" should be -- $Div_4$ --

Column 6, Line 60:   "$\Delta\Phi^c$" should be -- $\Delta\Phi_c$ --

UNITED STATES PATENT AND TRADEMARK OFFICE
CERTIFICATE OF CORRECTION

PATENT NO. : 6,975,165 B2
APPLICATION NO. : 10/942109
DATED : December 13, 2005
INVENTOR(S) : Jose Ma. Lopez Villegas and Josep Samitier I Marti It is certified that error appears in the above-identified patent and that said Letters Patent is hereby corrected as shown below:

Column 7, Line 31: "$O^1$ and $O^2$" should be -- $O_1$ and $O_2$ --

Column 7, line 45: "ó" should be -- and --

This certificate supersedes Certificates of Correction issued November 21, 2006 and April 10, 2007.

Signed and Sealed this

Nineteenth Day of June, 2007

JON W. DUDAS
*Director of the United States Patent and Trademark Office*